United States Patent Office 2,871,410
Patented Jan. 27, 1959

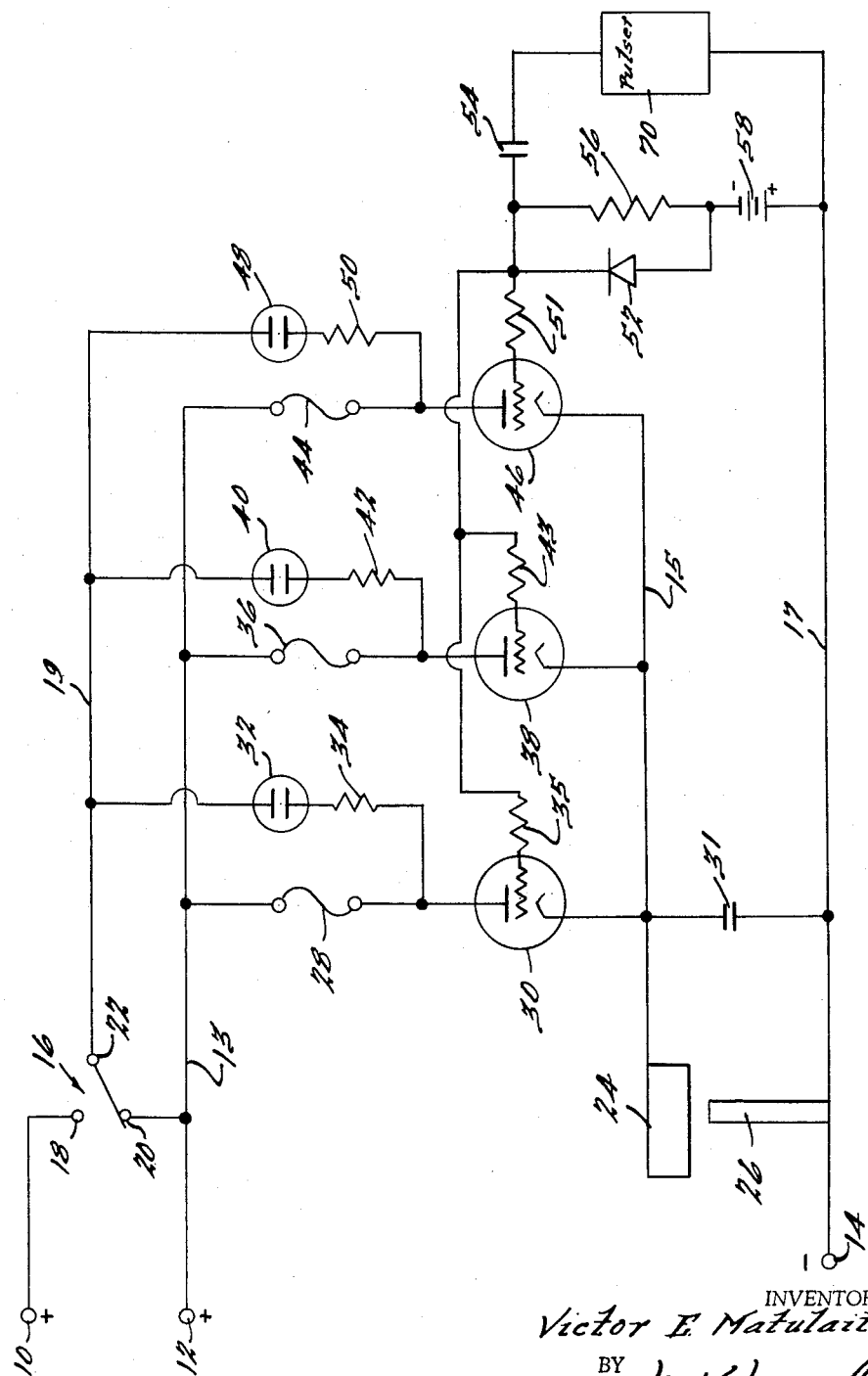

2,871,410

ELECTRICAL DISCHARGE MACHINING WATCHDOG CIRCUIT

Victor E. Matulaitis, Franklin, Mich., assignor to Elox Corporation of Michigan, Royal Oak, Mich., a corporation of Michigan Application June 24, 1957, Serial No. 667,610

2 Claims. (Cl. 315—120)

This invention relates to improvements in electronic circuits, particularly in circuits employing a large number of electronic tubes as components thereof, and while my improved circuit is especially useful in connection with electrical-discharge-machining apparatus, I wish it to be specifically understood that my invention is applicable to other types of apparatus embodying electronic tubes and by disclosing the details and teachings of my invention in the environment herein described, I do not intend to limit the scope thereof except as set forth in the appended claims.

Electrical-discharge-machining of metals and metallic substances, referred to herein as EDM, and sometimes called "arc-machining," "spark-machining," etc., has progressed to a point where relatively huge amounts of power are fired across the gap between the electrode and the workpiece in comparison to the weak arcs produced in the "tap-busters" of a few years ago.

Improvements in machining rate, finish, tolerances, etc., have dictated the use of electronic tubes in the power and control circuits of such apparatus and because such tubes handle only relatively small amounts of power, large numbers of tubes (sometimes thousands) have been connected in parallel to obtain necessary gap current density.

It is well known that such tubes vary in useful life and that some fail within a few hours after being put in use even though they appear to be perfect when tested. In EDM apparatus, failure of a single tube not only interferes with the efficient functioning of the apparatus, but in many instances (because EDM is essentially an automatic process) results in damage to an expensive workpiece which may require scrapping the same. It is therefore essential that in EDM apparatus, means be provided that will automatically cut off the power to a defective tube in the event of failure.

Accordingly, it is the principal object of my invention to provide means for automatically disconnecting from an electronic circuit any defective individual tube of a tube bank so that the defective tube can not produce malfunction of the circuit.

Another object is to provide in such a circuit automatically operable indicating means for indicating presence of a defective tube.

Still another object is to provide means for checking the readiness of the automatic indicating means to perform its function.

Other objects and advantages of the invention will become apparent from the following description which, taken in conjunction with the accompanying drawing, discloses a preferred form of the invention.

The drawing is a schematic electrical-discharge-machining circuit with my invention shown in schematic form in conjunction therewith.

In the drawing, reference numerals 10 and 12 designate positive input terminals, and numeral 14 designates the negative terminal of D. C. voltage sources. The voltage across terminals 10 and 14 is higher than the voltage across terminals 12 and 14 for reasons which will be made clear. In the specific example about to be described, the D. C. voltage across 10 and 14 is preferably about 200 and the voltage across 12 and 14 is about 125.

The EDM power tube bank is represented by the tubes 30, 38 and 46, the anodes of which are connected in parallel to the positive current conductor 13 through individual fuses 28, 36 and 44, respectively. The cathodes of the tubes are parallelly connected through conductor 15 to a workpiece 24 which is mounted on the bed of the EDM machine in a coolant bath and in suitably spaced relationship to an electrode 26 as is now well known in the electrical-discharge-machining art. The electrode 26 is connected to the negative side of the power input by a conductor 17 and is preferably automatically fed toward the workpiece by means of automatic servo means which is known in the art and the details of which will be omitted because they form no part of the present invention.

A condenser 31 may be connected across the gap between the electrode and workpiece if desired but may be omitted without affecting the circuit adversely. A pulser 70 is connected into the grid circuits of the tube bank through a coupling condenser 54. This pulser may be of any desired type obtainable commercially but is preferably one which will provide a high frequency signal to the tube grids with a substantially rectangular time-voltage characteristic and with the "on" component thereof considerably shorter than the "off" portion.

The tube bank grids are connected to a source of negative bias voltage 58 through a suitable grid leak resistor 56. A rectifier 52 is connected across the resistor to provide "clamping action." This clamping action is well known in the electronic art and will not be elaborated upon except to state that the network 52, 56, 58, assures that the signal received by the grids of the tube bank will be at all times positive with respect to the negative bias voltage 58. Thus when the pulser 70 is "off," no current will pass through the tube bank because the tubes 30, 38, 46, etc., are biased to cut-off, it being understood that the potential of source 58 is sufficiently negative with respect to point 14 as to effectively render the tubes non-conducting.

In response to a pulse from pulser 70 which should be of sufficient magnitude to drive the tube bank grids to substantially zero bias, the tube bank will conduct and thus fire the gap between the electrode 26 and workpiece 24.

Connected in parallel with the fuses 28, 36 and 44, are gas filled lamps of the type known as "neon indicator lamps." These lamps are respectively connected in series with current limiting resistors 34, 42 and 50. These lamps are connected by a conductor 19 with terminal 22 of a single pole, double throw switch 16. During normal operation of the circuit, the switch is in the "operate" position shown, at which time the switch arm connects the terminal 22 with terminal 20 which is electrically connected to positive input terminal 12. It is clear therefore that during normal operation of the apparatus, the indicating lamps 32, 40, 48, are short-circuited by the respective fuses 28, 36, 44.

Operation of the circuit is as follows:

Let it be assumed that the EDM circuit is functioning normally with the pulser 70 transmitting signals of desired characteristic to the tube bank which, in turn, is firing across the machining gap. In the event of a failure of any one of the tubes of the bank, say for example, a short-circuit or a partial short-circuit between a grid and its associated anode or cathode, said tube will attempt to pass an abnormally high current. Fuses 28, 36 and 44 are preferably rated at 150 to 200 percent of normal tube bank current and under the condition described the fuse associated with the defective tube will blow.

Blowing or opening of a fuse—let us assume it is the fuse 28, indicating malfunction of the tube 30—will result in current flow through lamp 32 and thus indicate that a fuse has blown and the presence of a defective tube. Preferably the neon lamps are disposed in adjacent or close physical proximity to the associated tubes so visual inspection will readily locate the defective tube.

Grid resistors 35, 43, 51, etc., serve the dual function of suppressing parasitic oscillations that may develop within the tube bank and of providing sufficient decoupling impedance between the grids of the individual tubes of the bank and the pulser 70 such that, in the event of a direct short-circuit between the grid of any tube and its anode or cathode, the signal from the pulser is not effectively short-circuited at the grids of the normally functioning tubes of the bank. The power output of the pulser is chosen to be of sufficient magnitude such that a short of the type just mentioned will decrease the voltage at the grids of the normally functioning tubes only 10 to 15 percent. In other words, such a malfunctioning of the circuit will not "load" the signal output of the pulser appreciably.

Frequently the tube bank of an EDM assembly will comprise hundreds of tubes and obviously it is highly desirable that means be provided for readily checking the operativeness of the defective tube indicating means. If such checking facilities are not provided, the failure indicating means is not absolutely dependable because a number of contingencies could exist which could render the trouble indicators inoperative. For example, a neon indicating lamp could be initially defective through ageing or physical damage, the resistor in series with the lamp could be broken or open-circuited, the circuit wiring could be damaged, poorly soldered joints could exist, etc.

Accordingly I have provided checking means which will instantly check the operativeness of the lamps whenever desirable. This feature comprises provision of an auxiliary voltage source 10 of considerably higher potential. In the example described, the voltage between terminals 12 and 14 is 125 volts and the voltage between terminals 10 and 14 is 200 volts.

The arm of switch 16 may be thrown from contact 20, the "operating" contact, to contact 18, the "test" contact. All of the neon lamps then will glow (unless a lamp is defective) because the lamps are subjected to the voltage difference between terminals 10 and 12—in this case, 75 volts. Current flows from input terminal 10, through the switch 16, through conductor 19, through the lamps, associated resistors and fuses to conductor 13, thence to input terminal 12. Thus an instantaneously operable test is provided which will indicate whether any lamp is defective. This test may be performed any any time power is on in the circuit, even during cutting.

It will therefore be seen that I have provided a simple safety or "watch-dog" circuit for use in EDM apparatus which automatically indicates faults in the electronic components thereof and provides for testing the safety circuit to make sure it is functioning.

I claim:

1. In an electronic circuit having a triode power tube connected across a voltage source and operative to transmit power pulses in response to signals impressed on the grid of said tube from a pulsating signal source, means for automatically disconnecting said tube from said circuit upon said tube becoming defective in such manner that it is capable of transmitting abnormal current comprising a fuse connected in one of the power leads to said tube, means for indicating opening of said fuse comprising a glow lamp connected in parallel with said fuse, and means of testing the operability of said lamp comprising means for connecting said fuse and lamp in series across a relatively higher voltage source.

2. In an electrical-discharge-machining apparatus having an electrode adapted to be disposed in machining relationship with a workpiece, a power source having its negative side connected to said electrode, means for firing intermittent electrical discharge across a gap between said electrode and a workpiece comprising a triode tube having its cathode connected to said workpiece and its anode connected to the positive side of said power source, means controlling firing of said gap comprising a pulser connected in the grid circuit of said tube, a fuse connected in the anode circuit of said tube adapted to open the circuit at predetermined overload current, a neon glow-lamp connected in parallel with said fuse and adapted to glow in response to opening of said fuse, and means for momentarily connecting said lamp and fuse in series with a voltage sufficiently high to cause said lamp to glow for testing the operability of said lamp.

References Cited in the file of this patent

UNITED STATES PATENTS

| | | |
|---|---|---|
| 2,022,406 | Cook | Nov. 20, 1935 |
| 2,036,223 | Lapple | Apr. 7, 1936 |
| 2,422,886 | Chittum | June 24, 1947 |
| 2,496,049 | Henry | Jan. 31, 1950 |
| 2,804,575 | Matulaitis | Aug. 27, 1957 |